United States Patent
Yu et al.

(10) Patent No.: US 8,358,936 B2
(45) Date of Patent: Jan. 22, 2013

(54) METHOD AND APPARATUS FOR AN OPTICAL DUTY CYCLE FOR AN OPTICAL DIGITAL COHERENT SYSTEM

(75) Inventors: Jianjun Yu, Princeton, NJ (US); Lei Xu, Princeton Jct., NJ (US); Dayou Qian, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 591 days.

(21) Appl. No.: 12/562,251

(22) Filed: Sep. 18, 2009

(65) Prior Publication Data

US 2010/0086314 A1   Apr. 8, 2010

Related U.S. Application Data

(60) Provisional application No. 61/102,026, filed on Oct. 2, 2008.

(51) Int. Cl.
*H04B 10/04* (2006.01)
*H04B 10/12* (2006.01)

(52) U.S. Cl. .................................. 398/188; 398/183
(58) Field of Classification Search .................. 398/188, 398/183

See application file for complete search history.

(56) References Cited

U.S. PATENT DOCUMENTS

| | | | |
|---|---|---|---|
| 2004/0028417 A1* | 2/2004 | Essiambre et al. | 398/188 |
| 2009/0034988 A1* | 2/2009 | Akiyama et al. | 398/198 |

* cited by examiner

*Primary Examiner* — Danny Leung
(74) *Attorney, Agent, or Firm* — Joseph Kolodka

(57) ABSTRACT

An optical apparatus includes a quadrature phase shift keying modulator for generating a non-return-to-zero quadrature phase shift keyed NRZ-QPSK signal from a received lightwave, the modulator being driven by a radio frequency RF signal, an intensity modulator for carving the NRZ-QPSK signal to return-to-zero RZ pulses with a different duty cycle than that of the NRZ-QPSK, the intensity modulator being driven by a radio frequency RF clock signal to change the NRZ-QPSK to an RZ-QPSK signal, and an optical filter with a narrow band for filtering the signal from the intensity modulator to increase optical power that is useable by an optical digital coherent detection system.

6 Claims, 1 Drawing Sheet

Duty cycle: t2/t1 t2 is the half pulsewidth
t1 is the period

METHOD AND APPARATUS FOR AN OPTICAL DUTY CYCLE FOR AN OPTICAL DIGITAL COHERENT SYSTEM

This application claims the benefit of U.S. Provisional Application No. 61/102,026, entitled "Transmission of Hybrid 112 and 44 Gb/s Pol-Mux QPSK in 25 GHz Channel Spacing over 1040 km SSMF Employing Digital Coherent detection and EDFA-only Amplification", filed on Oct. 2, 2008, the contents of which is incorporated by reference herein.

BACKGROUND OF THE INVENTION

The present invention relates generally to optical systems, and more particularly, to optical digital coherent systems.

Multi-level (amplitude or phase) modulation formats, such as 8 PSK, 8 QAM or 16 QAM can be used to increase spectral efficiency. However, these signals with multi-level modulation need a high optical-signal-to-noise-ratio OSNR, which largely limits the transmission distance. Also, high optical-signal-to-noise-ratio OSNR transmitters are more complicated. Relative to these modulation formats, quadrature phase shift keying QPSK modulation systems have a simple configuration, but they have wide spectrum requirements at the same bit rate. Hence, the spectral efficiency for quadrature phase shift keying QPSK modulation systems is not high. Using optical sharp (tight) filter can increase the spectral efficiency of this signal, but this sharp filter usually degrades the transmission performance.

Accordingly, there is a need for increasing the spectral efficiency while maintaining good performance in a QPSK modulation system with a high optical-signal-to-noise-ratio OSNR.

SUMMARY OF THE INVENTION

In accordance with the invention, there is provided an optical apparatus includes a quadrature phase shift keying modulator for generating a non-return-to-zero quadrature phase shift keyed NRZ-QPSK signal from a received lightwave, the modulator being driven by a radio frequency RF signal, an intensity modulator for carving the NRZ-QPSK signal to return-to-zero RZ pulses with a different duty cycle than that of the NRZ-QPSK, the intensity modulator being driven by a radio frequency RF clock signal to change the NRZ-QPSK to an RZ-QPSK signal, and an optical filter with a narrow band for filtering the signal from the intensity modulator to increase optical power that is useable by an optical digital coherent detection system.

In an alternative aspect of the invention, a method includes generating a non-return-to-zero quadrature phase shift keyed NRZ-QPSK signal from a received lightwave, the modulator being driven by a radio frequency RF signal; carving the NRZ-QPSK signal to return-to-zero RZ pulses with a different duty cycle than that of the NRZ-QPSK, the intensity modulator being driven by a radio frequency RF clock signal to change the NRZ-QPSK to an RZ-QPSK signal; and filtering the signal from the intensity modulator to increase optical power that is useable by an optical digital coherent detection system.

In a preferred embodiment the return-to-zero RZ signal pulses have a duty cycle different than that of the NRZ-QPSK signal received, the different duty cycle can be generated by adjusting the amplitude of the driving RF signal, the different duty cycle can be generated by at adjusting a DC bias on the intensity modulator, the increase in optical power is derived from the duty cycle of the RZ-QPSK signal being smaller than that of the NRZ-QPSK signal the increase in optical power is derived from the duty cycle of the RZ-QPSK signal being smaller than that of the NRZ-QPSK signal to increase the width of the optical spectrum of the RZ-QPSK signal, and preferably the duty cycle of the RZ-QPSK signal is smaller than 0.5.

BRIEF DESCRIPTION OF DRAWINGS

These and other advantages of the invention will be apparent to those of ordinary skill in the art by reference to the following detailed description and the accompanying drawings.

DETAILED DESCRIPTION

Figure 1:
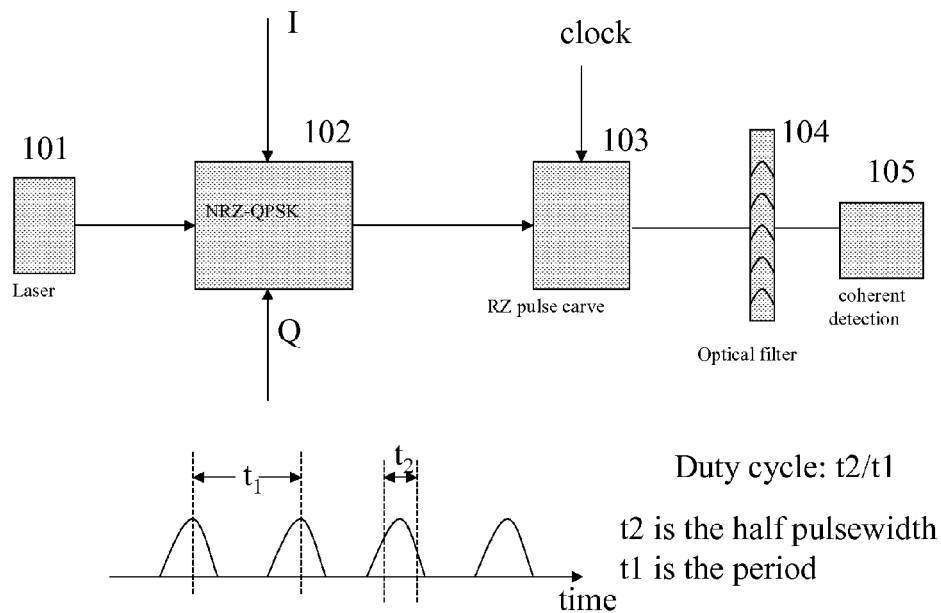
FIG. 1 is a diagram of an exemplary optical transmission apparatus in accordance with the invention.

The invention is directed a method and apparatus that optimizes the pulse width or duty cycle of an optical signal to improve optical signal performance after tight filtering. The inventive optimization of duty cycle in an optical digital coherent system is demonstrated by the exemplary apparatus of FIG. 1 and the corresponding diagram of FIG. 2 which shows the optical spectra with different duty cycle.

The lightwave generated laser (101) is modulated by an QPSK optical modulator (102) driven by a radio frequency signal RF, shown as I and Q signal components to provide a non-return-to-zero quadrature phase shift keyed NRZ-QPSK signal. This modulation can be realized by cascaded serial or parallel modulators. Then, one intensity modulator (103) is driven by a clock signal to change the non-return-to-zero NRZ signal from the modulator 102 to return-to-zero RZ pulses. This RZ pulse with a different duty cycle can be generated by adjusting the driving RF signal amplitude or DC bias (not shown) on the intensity modulator (103). Then one narrow band optical filter (104) is used to provide tight filtering. The receiver side is a regular digital coherent detection (105) apparatus.

Figure 2:
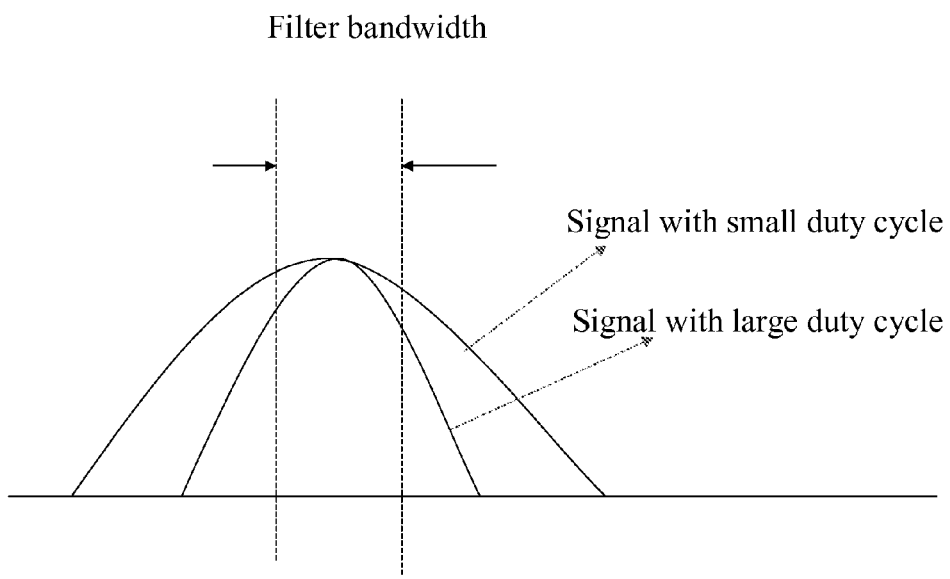
FIG. 2 is diagram of optical spectra efficiency with different duty cycle from the apparatus of FIG. 2.

In this application, the duty cycle should be smaller than 0.5, and the optimal duty cycle should be ~0.33. The smaller the duty cycle, the wider the optical spectrum, as shown by the diagram of FIG. 2. After tight filtering, it can be seen that more useful optical power is kept when the duty cycle is small. This is the main reason why the performance can be improved after tight filtering when the duty cycle is small. This application should be useful for other multi-level modulation formats, such as 8 PSK (phase shift keying), 8 QAM (quadrature amplitude modulation), 16 QAM or high level modulation formats when a digital coherent detection receiver is employed.

Referring again to FIG. 1, the light source 101 can be either a distributed feedback laser diode DFB-LD or a tunable external laser. The DFB-LD usually has a wide line width and for 100 Gbit/s QPSK, the line width is smaller than 2 MHz, which is acceptable. Use of the DFB-LD is difficult for high-level modulation format signals. The DFB-LD is relatively inexpensive. The external tunable laser provides a narrow line width, low phase noise, but is relatively expensive. The tunable external laser is preferred for high level modulation format signals.

The QPSK modulator 102 used to generate the QPSK NRZ signal can be attained using cascaded modulators in a serial configuration or parallel configuration. Other types of format modulators can be used such as either phase shift keyed 8 PSK, 8 quadrature amplitude modulated 8 QAM or other high level modulator scheme.

The optical filter 104 can be a WDM filter that can be used for a few channels, a regular tunable optical filter with one channel usually being used, an optical interleaver that can be used for the WDM channels or Fiber Bragg grating with one channel usually being used.

The digital coherent detection 105 can include a polarization diversity hybrid modulator, one local oscillator, photodiodes, high speed AD and other optical or electrical components The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An optical apparatus comprising:
   a quadrature phase shift keying modulator for generating a non-return-to-zero quadrature phase shift keyed NRZ-QPSK signal from a received lightwave, the modulator being driven by a radio frequency RF signal;
   an intensity modulator for carving the NRZ-QPSK signal to return-to-zero RZ pulses with a different duty cycle than that of the NRZ-QPSK, the intensity modulator being driven by a radio frequency RF clock signal to change the NRZ-QPSK signal; and
   an optical filter with a narrow band for filtering the signal from the intensity modulator; and
   an optical digital coherent detection system which receives the filtered signal;
   wherein the duty cycle of the RZ-QPSK signal is smaller than that of the NRZ-QPSK signal, the duty cycle of the RZ-QPSK signal being smaller than 0.5.

2. The optical apparatus according to claim 1, wherein the different duty cycle is generated by at adjusting the amplitude of the driving RF signal.

3. The optical apparatus of claim 1, wherein the different duty cycle can be generated by at adjusting a DC bias on the intensity modulator.

4. A method comprising:
   generating a non-return-to-zero quadrature phase shift keyed NRZ-QPSK signal from a received lightwave, the modulator being driven by a radio frequency RF signal;
   carving the NRZ-QPSK signal to return-to-zero RZ pulses with a different duty cycle than that of the NRZ-QPSK, the intensity modulator being driven by a radio frequency RF clock signal to change the NRZ-QPSK to an RZ-QPSK signal;
   filtering the signal from the intensity modulator; and
   applying the filtered signal to an optical digital coherent detection system;
   wherein the duty cycle of the RZ-QPSK signal is smaller than that of the NRZ-QPSK signal, the duty cycle of the RZ-QPSK signal being smaller than 0.5.

5. The method according to claim 4, wherein the different duty cycle are generated by at adjusting the amplitude of the driving RF signal.

6. The method according to claim 4, wherein the different duty cycle can be generated by at adjusting a DC bias on the intensity modulator.

* * * * *